US 6,572,475 B1

(12) United States Patent
Okabe et al.

(10) Patent No.: US 6,572,475 B1
(45) Date of Patent: Jun. 3, 2003

(54) DEVICE FOR SYNCHRONIZING AUDIO AND VIDEO OUTPUTS IN COMPUTERIZED GAMES

(75) Inventors: Teruo Okabe, Tokyo (JP); Hiroshi Yagi, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/010,280

(22) Filed: Jan. 21, 1998

(30) Foreign Application Priority Data

Jan. 28, 1997 (JP) ............................................. 9-013690

(51) Int. Cl.[7] ................................................ A63F 9/24
(52) U.S. Cl. .......................................... 463/30; 463/35
(58) Field of Search ...................... 463/75, 640, 30–34; 381/17–18; 345/304, 978, 419, 582, 589, 619, 637, 473

(56) References Cited

U.S. PATENT DOCUMENTS

| | | | | |
|---|---|---|---|---|
| 4,874,164 A | * | 10/1989 | Miner et al. | |
| 5,026,051 A | * | 6/1991 | Lowe et al. | 273/435 |
| 5,052,685 A | * | 10/1991 | Lowe et al. | 273/460 |
| 5,095,798 A | * | 3/1992 | Okada et al. | 84/609 |
| 5,138,660 A | * | 8/1992 | Lowe et al. | 381/17 |
| 5,299,810 A | * | 4/1994 | Pierce et al. | |
| 5,556,107 A | * | 9/1996 | Carter | 463/35 |
| 5,682,433 A | * | 10/1997 | Pickard et al. | 381/61 |
| 5,754,660 A | * | 5/1998 | Shimizu | 381/17 |
| 5,768,393 A | * | 6/1998 | Mukojima et al. | 381/17 |
| 5,796,843 A | * | 8/1998 | Inanaga | 381/17 |
| 5,798,922 A | * | 8/1998 | Wood et al. | 364/400.01 |
| 5,850,455 A | * | 12/1998 | Arnold et al. | 381/17 |
| 5,862,228 A | * | 1/1999 | Davis | 381/15 |
| 5,862,229 A | * | 1/1999 | Shimizu | 381/17 |
| 5,926,400 A | * | 7/1999 | Kytle et al. | 364/578 |

* cited by examiner

Primary Examiner—Mark Sager
(74) Attorney, Agent, or Firm—Keating & Bennett, LLP

(57) ABSTRACT

It is an object of this invention to provide a game device capable of accurately synchronizing the display of pictures with sounds.

A game device for displaying a sound source object, which is virtually considered to be a sound source, on a screen and for producing a sound related to the sound source object from a built-in sound source is designed to obtain an audio parameter which defines a sound to be outputted from the sound source on the basis of a display parameter of an object, the display parameter determining the mode of displaying the sound source object as a picture, and to set the audio parameter at the sound source. As a result, the formation of pictures of the sound source object and the control of the sound source are performed in the same frame cycle for the display of pictures and, therefore, the display of pictures of the object is synchronized with the production of sounds.

19 Claims, 11 Drawing Sheets

FIG.9

OBJECT DATA STRUCTURE (2)

| |
|---|
| OBJECT NUMBER |
| AUDIO DATA NUMBER |
| X POSITION |
| Y POSITION |
| AUDIO IMAGE POSITION PARAMETER |
| Z POSITION |
| DEPTH PARAMETER |
| DIRECTION OF X COMPONENT OF NORMAL |
| DIRECTION OF Y COMPONENT OF NORMAL |
| DIRECTION OF Z COMPONENT OF NORMAL |
| SIZE L |
| VOLUME PARAMETER V |
| COLOR AND BANK DESIGNATION C |

FIG.12
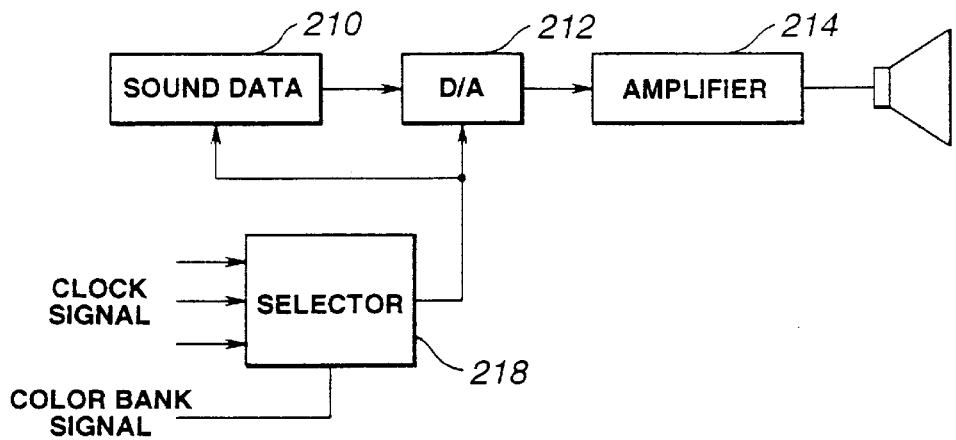
FIG.13
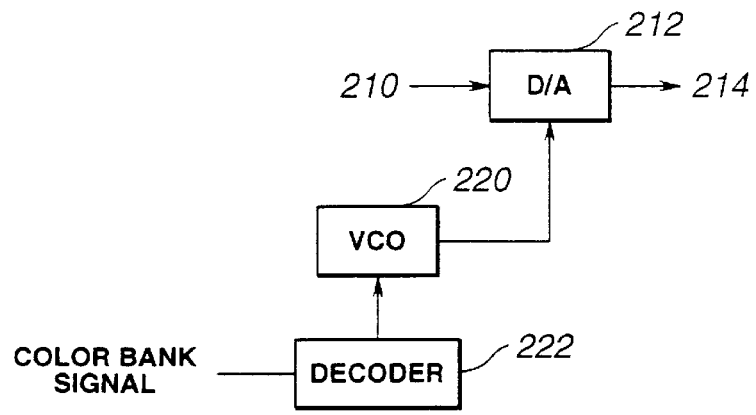
FIG.14
COLOR DESIGNATION CODE
| COLOR BANK | STANDARD COLOR ADDRESS |
|---|---|

DEVICE FOR SYNCHRONIZING AUDIO AND VIDEO OUTPUTS IN COMPUTERIZED GAMES

BACKGROUND OF THE INVENTION

The present invention relates to improvements of a game device which comprises a picture processing portion for displaying objects within view on a screen by moving a visual point located in a three-dimensional virtual game space. More particularly, this invention relates to a game device which is designed to set an audio parameter of a sound source, which is a physical mechanism for producing sounds, by using a display parameter for displaying pictures of objects.

A game device is designed to enhance realistic excitement by outputting pieces of music and sounds corresponding to scenes together with animation displayed on a screen. For example, various objects are located in a virtual space which is constructed in a three-dimensional coordinate system, thereby forming a virtual game space, and leading characters (objects) of a game freely move in the game space to increase scores Objects are therein used to display things moving around on the screen (such as a player's character, enemy characters, bullets and bombs). It is possible to freely control at which position on the screen the object should be displayed. It is also possible to display a plurality of objects simultaneously. A game is designed to have rhythmical music (BGM) played in the background during the proceeding of the game. In a car race game, an engine sound, a slip sound, a crash sound or the like is produced in accordance with the proceeding of the game. For this purpose, pictures (or scenes) to be formed in accordance with the proceeding of a game as well as sound outputs corresponding to such pictures are previously provided on a program that describes a game story. Consequently, pieces of music and sounds are produced at an appropriate timing in accordance with the proceeding of a game.

For example, in a setting where a person in a room opens a window and then sounds of cars and people's voices are heard from outside, a CPU performs a program with the proceeding of a game described thereon, and forms a scene by locating an object in a virtual space and making the object open a window. Then, the CPU gives a sound processing portion (sound processor) a command to output sounds corresponding to the window-opening scene. In a setting where a window is closed and then sounds from outside are no longer heard, the CPU first locates an object and forms the window-closing scene and then gives the sound processing portion (sound processor) a command to suspend outputting corresponding sounds However, the CPU locates an object in the virtual space and finishes forming a scene and then outputs a sound production command (parameter setting) to have sounds produced. This sound production command goes through various interface portions and then reaches the sound processing portion where data processing is performed to produce corresponding sounds in accordance with the sound production command by means of the sound processor, a sound source or the like. Accordingly, the production of sounds is later than the display of pictures and, therefore, it is difficult to accurately synchronize pictures with sounds. In order to achieve synchronization as much as possible, it is necessary to write a program with consideration of time required for sound processing and picture processing. However, when individual users use different computer systems, processing ability is different for each CPU and, therefore, it is difficult to deal with such a situation.

SUMMARY OF THE INVENTION

Accordingly, it is an object of this invention to provide a picture processing device and a game device which are capable of synchronizing the display of pictures with the production of sounds more accurately.

In order to achieve the above-described object, a game device of this invention comprises:

storage means (1b, 102) for storing a plurality of object data including a display parameter for representing a display condition of an object to be located in a virtual space;

game proceeding means (10) for proceeding a game by locating the object in the virtual space in accordance with a game program and by controlling movements of a predetermined object;

picture processing means (11) for transforming the object, which has come into view as seen from a visual point located in the virtual space, into an image of a screen coordinate system and for displaying the image on a picture display unit;

a game sound source (12) for producing sounds which accompany the game; and sound source controlling means for controlling the game sound source on the basis of the display parameter of a sound source object which should serve as a sound producing source for at least the object which has come into view.

Such a structure makes it possible to process outputs of game pictures of a game proceeded in a three dimensional virtual space and outputs of game music in a parallel manner, and also makes it easy to synchronize the movements of game characters with the production of sounds (or music) related to such game characters.

The sound source controlling means includes:

reading means for reading the display parameter from object data of the sound source object; and audio parameter generating means for converting the read display parameter into an audio parameter for representing a sound production condition of the gave sound source.

This makes it possible to form the audio parameter on the basis of the display parameter.

The audio parameter generating means converts the display parameter into the audio parameter by means of a conversion function or a conversion table.

This makes it possible to obtain the audio parameter by making appropriate modifications to the display parameter, which is preferred in achieving a better control.

The audio parameter generating means outputs the display parameter as the audio parameter without making any changes.

If control inputs of the sound source are designed in conformity to the display parameter, it is possible to use the display parameter as the audio parameter without making any changes.

The display parameter includes at least any one of the following among an object size, object color information, object transparency, reflectance ratio, and display priority when objects seem to overlap one over another.

Such a display parameter determines how objects are seen in the virtual space.

The audio parameter is updated in a frame update cycle of the picture display unit.

This makes it possible to easily synchronize the movements of objects with sounds.

The audio parameter includes at least any one of the following among an audio image position parameter, a depth (perspective of a sound) parameter, a volume (sound power level) parameter, and a reverb parameter.

Inclusion of such an audio parameter makes it possible to form a sound field with a realistic excitement of a game space.

The game device comprises:

storage means (1b, 102) for storing object data of an object group including a sound source object (FIG. 9), the sound source object having a display parameter for representing a display condition of the object located in a virtual space and an audio parameter for representing a sound production condition when the object is an object to serve as a sound producing source;

game proceeding means (10) for proceeding a game by locating the object in the virtual space in accordance with a game program and by controlling movements of the object;

picture processing means (11) for transforming the object, which has-come into view as seen from a visual point located in the virtual space, into an image of a screen coordinate system and for displaying the image on a picture display unit;

a game sound source (12) for producing sounds which accompany the game; and sound source controlling means for controlling the game sound source on the basis of the audio parameter of the sound source object among at least the object which has come into view.

Since the audio parameter is previously included in the object data, such a structure makes it possible to cause the sound source to directly utilize the audio parameter.

The sound source controlling means modifies the audio parameter by means of a conversion function or a conversion table and uses the modified audio parameter.

This makes it possible to control the sound source in a more diverse and more appropriate manner.

The display parameter includes at least any one of the following among an object position in the virtual space, an object size, object color information, object transparency, reflectance ratio, and display priority when objects seem to overlap one over another.

Such a display parameter determines how objects are seen in the virtual space.

The audio parameter is updated in a frame update cycle of the picture display unit.

Such a structure makes it easy to synchronize the formation of pictures with the production of sounds and to quickly produce sounds.

The audio parameter includes at least any one of the following among an audio image position parameter, a depth parameter, a volume parameter, and a reverb parameter.

This makes it possible to obtain a sound effect full of realistic excitement.

A game device of this invention is a game device for displaying on a picture display unit an object related to a game in accordance with a game program and for producing, from a sound source, game sounds (e.g. sounds of gun shots, footsteps, etc.) corresponding to the displayed object, wherein an audio parameter for determining a sound production condition of the sound source is updated by an object display parameter for representing a display mode of the object on a screen.

Such a structure is preferred because in such a structure the audio parameter is set in a cycle of picture formation and, therefore, pictures are synchronized with sounds.

The display parameter of the object is represented in a screen coordinate system.

This makes it possible to reduce the operation amount required for the coordinate transformation.

The update of the audio parameter is performed in a frame update cycle of the picture display unit.

This makes it easy to synchronize pictures with sounds and to quickly produce sounds.

The audio parameter includes at least any one of the following among an audio image position parameter, a depth parameter, a volume parameter, and a reverb parameter.

This makes it possible to obtain a sound effect full of realistic excitement.

An information storage medium of this invention stores a program for activating a computer system as the game device described above.

A picture of a game device is updated in a frame cycle of a display (for example, one-sixtieth of a second or one-thirtieth of a second). Accordingly, the use of object display data, which is input data for picture formation, as the audio parameter makes it possible to obtain sounds linked (or synchronized) with pictures and to form a sound field corresponding to a position of an object in the virtual space.

When the coordinate transformation of object data is conducted from the world coordinate system to the screen coordinate system, exclusion of object data outside view (i.e. such object data is not made subject to the coordinate transformation), so-called clipping, is conducted. Clipping is the processing to remove the portions that extend beyond a certain display area. When an area within an angle of visibility from a visual point is displayed, three-dimensional clipping is conducted. Along with this clipping, clipping of a sound source, which is located outside view, is conducted. Therefore, it is possible to reduce the production of unnecessary sounds by an invisible sound source.

When an object, which serves as a sound source, hides behind an object (such as a wall) within view, it is possible to control the production of sounds from the sound source by utilizing a parameter concerning object display priority. For example, it is possible to use a picture display parameter of semitransparency for the volume control.

Moreover, for example, when the size of an object is small, the production of sounds from the object is stopped. This organizes sound information with lower necessity for the progress of a game. Accordingly, it is possible to clarify sounds of an object which serves as the theme (or leading character) and to maintain an invigorating taste (or terseness) of a game.

BRIEF DESCRIPTION OF THE DRAWINGS

FIG. 9 shows an example of a second object data structure.

FIG. 12 is a block diagram that describes an example of changing a musical interval.

FIG. 13 is a block diagram that describes another example of changing a musical interval.

FIG. 14 shows an example of a color designation code.

DETAILED DESCRIPTION OF THE INVENTION

Figure 1:
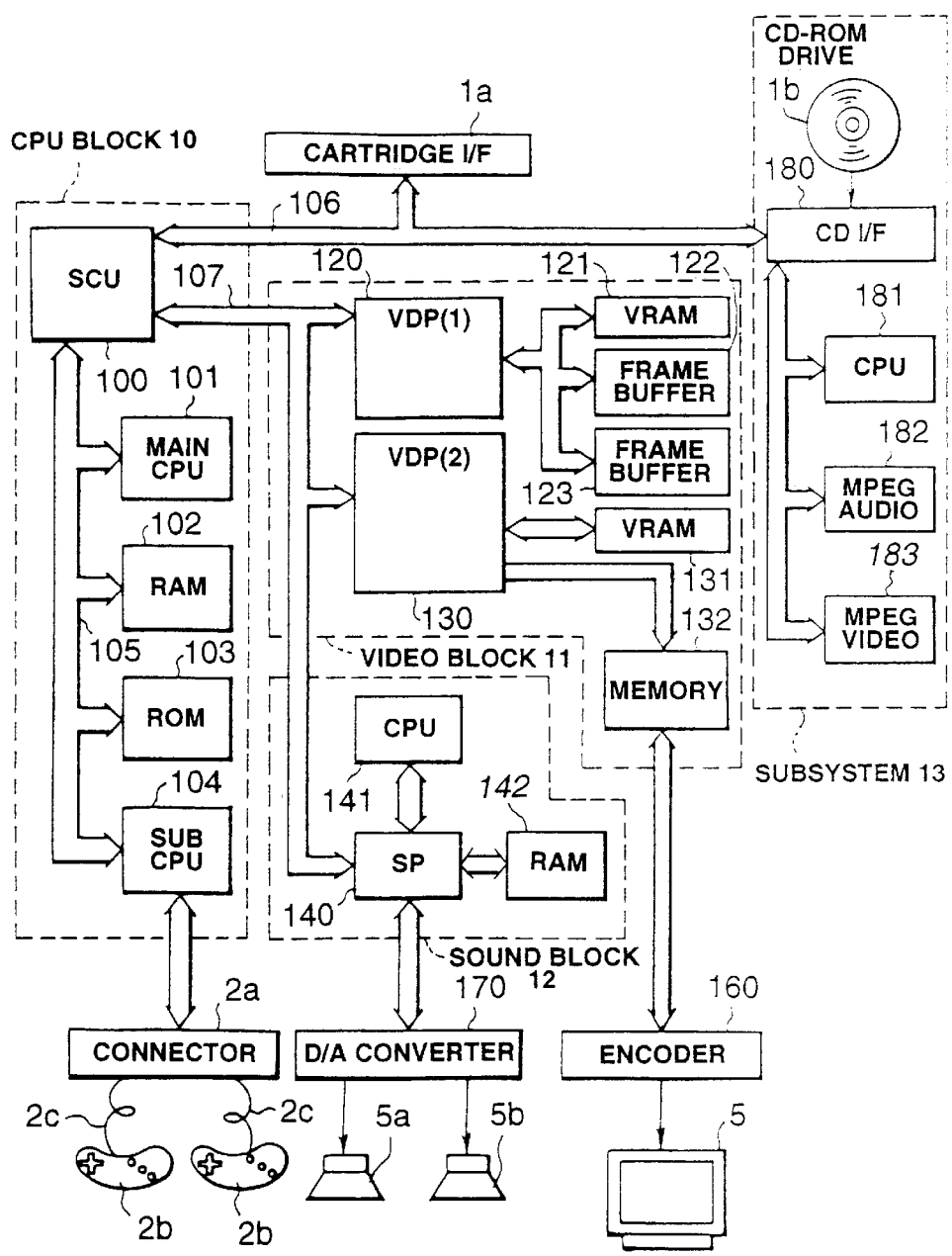
FIG. 1 is a block diagram that explains the entire structure of a game device.

FIG. 1 is a block diagram showing the outline of a video game device. This device is composed of: a CPU block 10 for controlling the device in its entirety; a video block 11 for controlling the display of a game screen; a sound block 12 for generating game sounds or the like; a subsystem 13 for reading a CD-ROM; and other elements.

The CPU block 10 is composed of an SCU (System Control Unit) 100, a main CPU 101, a RAM 102, a ROM 103, a CPU bus 103 and other elements. The main CPU 101 locates objects in the virtual space in accordance with a game program and controls the movements of a certain object, thereby developing a game. The CPU 101 also controls the device in its entirety. This main CPU 101 comprises the same operating function inside as that of a DSP (Digital Signal Processor) and is capable of executing application software at a high speed.

Cartridge (I/F) 1a interfaces with CPU block 10.

The RAM 102 is used as a work area for the main CPU 101. The ROM 103 has, for example, an initial program for initialization written thereon. The SCU 100 comprises a DMA controller, an interrupt controller and a DSP inside and is designed to perform smooth input and output of data between, for example, the main CPU 101, a VDP 120 and 130, a sound processor 140, and a CPU 141. The SCU 100 is capable of transmitting object (or sprite) data during a game to a VRAM within the video block 11. This makes it possible to perform application software of, for example, a game at a high speed. The cartridge I/F 1a is designed to input application software which is supplied in a ROM cartridge form.

The sub-CPU 104 is called an SMPC (System Manager & Peripheral Control). The sub-CPU 104 is provided with, for example, a function to collect peripheral data from an input device 2b through a connector 2a upon request of the main CPU 101. The main CPU 101 conducts processing, for example, to move a car (or object) on a game screen on the basis of the peripheral data received from the sub-CPU 104. A game pad 2b is connected to the connector 2a. It is also possible to connect optional peripherals such as a joystick or a keyboard to the connector 2a. Connecting two pads 2b to the connector 2a makes it possible to perform a game for plural game players. The sub-CPU 104 is provided with a function to automatically recognize the type of peripheral connected to the connector 2a (at a terminal on the main frame side) and to collect peripheral data or the like in a communication format in accordance with the type of peripheral.

The video block 11 comprises: a first VDP (Video Display Processor) 120 which mainly performs drawing of, for example, objects composed of polygon data in a video game; and a second VDP 130 which mainly performs drawing of background pictures, synthesis of polygon picture data (of objects) with the background pictures, and clipping processing.

The VDP 120 is connected to a VRAM 121 and a plurality of frame buffers (two buffers 122 and 123 are shown in FIG. 1). A command to draw polygons, which represent objects for a video game device, is sent from the main CPU 101 to the SCU 100 and then to the VDP 120 and is then written on the VRAM 121. The VDP 120 reads the drawing command from the VRAM into a system register inside and writes drawing data into the frame buffer. Drawing data of the frame buffer 122 or 123 is sent to the VDP 130. The VDP 120 is provided with, for example, the functions of: texture parts display to display objects in fixed forms, expanded or contracted objects, deformed objects or the like; formless objects display to display quadrilateral polygons, polylines, lines or the like; color operations such as semitransparent operation between parts, semiluminance operation, shadow operation, graduation operation, mesh operation or shading operation; mesh processing; and operation to interform clipping in order to avoid drawing ink regions other than the display area which has been set. The VDP 120 also functions as a geometrizer which performs matrix operations and is capable of quickly performing operations such as expansion, con traction, rotation, deformation or coordinate transformation.

The VDP 130 is connected to a VRAM 131 and it is constructed in a manner such that picture data outputted from the VDP 130 is outputted to an encoder 160 through a memory 132. In addition to the functions that the VDP 120 has, the VDP 130 is provided with, for example, a scrolling function to control a scroll picture display and a priority function to determine the priority order to display objects and pictures.

The encoder 160 adds synchronization signals or the like to the picture data, thereby generating video signals which are then outputted to a TV picture receiver 5 (or projector). Accordingly, pictures of various kinds of games are displayed on the TV picture receiver 5.

The sound block (sound source) 12 includes a sound processor 140, a sound CPU 141 and a RAM 142. The sound processor 140 comprises a sound source portion, a DSP and a digital mixer.

The CPU 141 is a processor responsible for sound processing and operates independently of the CPU block 10. This CPU 141 realizes the sound production and audio control described later and also reads, through the SCU 100, data regarding sound production conditions and waveform data, which are included in program data read from a CD-ROM, and stores such data in the RAM 142. Communication between the aforementioned main CPU 101 and programs is also possible.

Program data for operating the CPU 141 and commands from the CPU 141, the sound source portion of the sound processor 140, a DSP (Digital Signal Processor) and the main CPU 101 are written on the RAM 142. The RAM 142 also stores data (audio parameter) regarding sound production conditions and waveform data as transmitted from a CD-ROM as well as waveform data generated by FM sound synthesis. As described later, the audio parameter is also written by the main CPU 101.

The sound source portion (not shown) of the sound processor 140 performs PCM sound synthesis and FM sound synthesis on the basis of the waveform data stored in the RAM 142 and waveform data of an oscillator. It also performs data processing such as reverse and repeat on the basis of such waveform data. An audio data signal is added to the waveform data, which is hence made selectable.

The DSP (not shown) of the sound processor 140 is a high speed operation private circuit for performing a high speed operation on the basis of commands from the CPU 141 and waveform data supplied from the RAM 142 or the sound source portion. In accordance with various commands, the DSP performs processing of special sound effects such as echo, reverb or chorus, and filtering processing of sounds on the basis of an optional transfer function.

The digital mixer (not shown) of the sound processor 140 adjusts the volume of an audio signal to be output and the position of an audio image in accordance with a command from the CPU 141 and outputs such volume and the audio image position. The sound image position is a position of a sound source that a person feels in accordance with sounds outputted from the right and left speakers (or a plurality of speakers). This processing can be performed also by the DSP. If a reverb is added to the processing of the audio image position, it is possible to express the sense of distance (or the sense of depth, or the sense of perspective). Various parameters (operation conditions) for operating the sound source portion, the DSP and the digital mixer are set by the audio parameter or on the basis of the audio parameter.

The subsystem 13 is composed of a CD-ROM drive 1b, a CD I/F 180, a CPU 181, an MPEG AUDIO 182, an MPEG VIDEO 183 and other elements. This subsystem 13 has functions, for example to read application software supplied in the CD-ROM form and to reproduce animation. The CD-ROM drive 1b is designed to read data from a CD-ROM. The CPU 181 performs processing such as control of the CD-ROM drive 1b and correction of errors in the read data. The data read from a CD-ROM are supplied to the main CPU 101 through the CD I/F 180, a bus 106 and the SCU 100 and are utilized as application software The MPEG AUDIO 182 and the MPEG VIDEO 183 are devices for restoring data that are compressed in the MPEG (Motion Picture Expert Group) standards. Restoration of the MPEG compressed data, which are written on a CD-ROM, by using these MPEG AUDIO 182 and MPEG VIDEO 183 makes it possible to reproduce animation.

As a flow of data in relation to sounds, a command in the MIDI format together with picture data is first supplied from the CD-ROM 1b. The SCU 100 transfers this command to the sound block 12. When special signal waveform data is supplied from the CD-ROM 1b, the SCU 100 transfers such data to the RAM 142. The main CPU 101 determines, according to positions of a visual point of a virtual camera and objects in the virtual space upon generation of pictures, the volume of the audio signal, the sound image orientation, whether or not waveform processing should be performed, and the waveform data to be used, and the main CPU 101 writes such information as a command into the RAM 142. The CPU 141 of the sound block 11 decodes the waveform data specified according to the content of the MIDI data, thereby generating a sound signal at the sound source portion of the sound processor. When a command (audio parameter) for designating sound production conditions then exists, the CPU 141 causes the sound source portion, the DSP and the mixer of the sound processor 140 to perform processing according to the content of, for example, the volume, the sound image position and the frequency characteristics as indicated by this command.

The outline of picture formation by a video game device is hereinafter explained. Known methods can be employed for the picture formation. One example of such known methods is to locate a plurality of objects in the virtual space (the world coordinate system), thereby forming a game space. A route is set in this game space so that a visual point (or virtual camera) moves along the route. The plurality of objects included in a view area (or display area) as seen from a visual point position is stored in an object table at such a visual point. Object tables are formed for all the visual point positions and are made into a database. This database is stored on a CD-ROM of a game and is downloaded onto the RAM 102. As a result, when the visual point moves within the virtual space in accordance with a game program, it is possible to find objects to locate in a certain scene by referring to an object table of a present visual point position and to locate these objects to form the virtual space. Moreover, the game program controls the movements of active objects such as cars and airplanes and determines the positions of such active objects within the virtual space.

Figure 2:
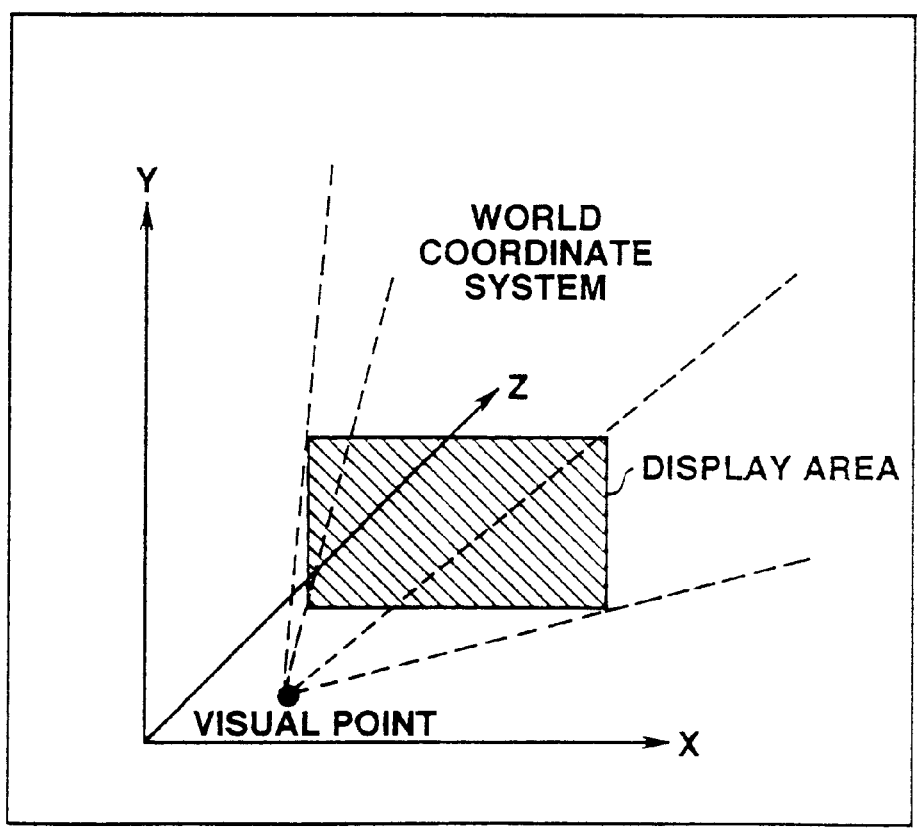
FIG. 2 shows the transformation of a virtual space formed in a three-dimensional system into a screen coordinate system.

As shown in FIG. 2, three-dimensional objects located in the virtual space (the world coordinate system) undergo the coordinate transformation processing such as a projection transformation or a screen coordinate system transformation, and are then drawn on a television monitor. In order to reduce the operational demands on a CPU, sometimes objects of a two-dimensional screen coordinate system as transformed from the three-dimensional objects are previously retained in a database, which is then used to form television pictures.

An explanation is hereinafter given about object data used in this invention. Object data according to this invention is characterized by its use as the audio parameter. Namely, it is possible to convert the display parameter of objects into the audio parameter and to use it for control of the sound source. It is also possible to include the audio parameter in object data. Furthermore, it is possible to use the display parameter as the audio parameter.

Figure 3:
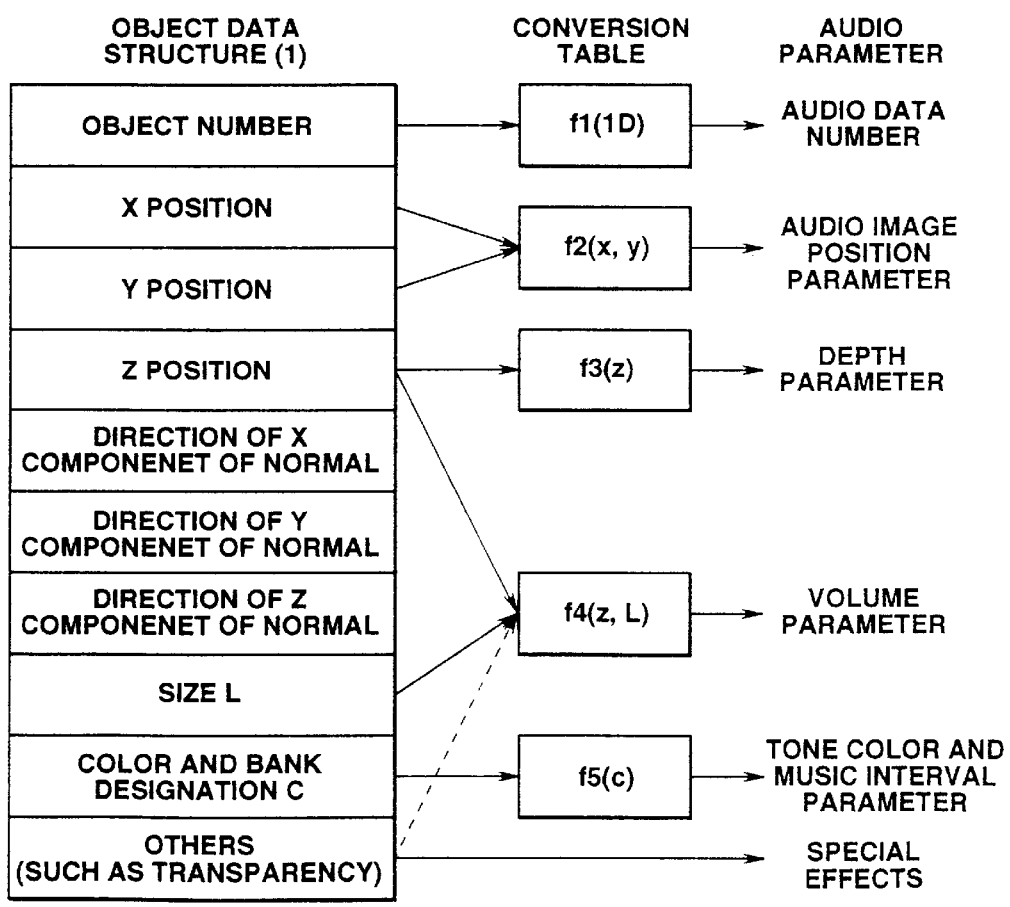
FIG. 3 explains an example of a first object data structure.

FIG. 3 shows an example of a first object data structure. This object data is composed by including the display parameter for specifying, for example, positions to locate objects in the three-dimensional virtual space and the display form of such objects. The object data (or display parameter) is generated, for example, by introduction from a CD-ROM by means of the CPU block 10 or by a simulation operation concerning movements of objects. Namely, the object data includes an object number to be attached in order to recognize all the objects, and X, Y and Z position data for respectively representing the X, Y and Z coordinate positions of the objects in the virtual space. The object data also includes data regarding directions of X, Y and Z components of a normal for respectively representing the X, Y and Z coordinate components of a normal vector which represents a direction of a face of an object. The object data also includes size data for representing the size of an object, color and bank designation data (color information) for representing a color designation code (a color address and a color bank as shown in FIG. 14) of an object, special expression effects of objects such as semi-transparent processing (transparency) or graduation, priority information to determine the object display priority when a plurality of objects seem to overlap one over another, and other information.

In a first embodiment of this invention which utilizes the above-described object data, upon the formation of pictures by using the object data, the display parameter of the object data is utilized as the audio parameter to be set in order to control the sound source (the sound source portion, the DSP and the mixer) 12. Namely, sound effects are set in relation to the position, shape and display mode of an object (sound source object), which is assumed as producing sounds, in the three-dimensional virtual space and also in relation to the visual point position.

A database of the sound source (the RAM 142) stores audio data that is previously made identifiable according to the object number of a sound source object. For example, an engine sound of an airplane or a car is stored as waveform data in a manner such that the waveform data can be read according to the object number. Consequently, it is possible to select the type of audio data in accordance with the object number (ID). According to the embodiment shown in FIG. 3, an audio data number is obtained from the object number by using a conversion table or a conversion function f1(ID)

The X position (and additionally the Y position if necessary) data of the object data is used to set an audio image position parameter. The audio image position parameter sets a balance between the volumes of right and left speakers of the sound source (digital mixer) and forms the sense of image position of sounds corresponding to an object position. As shown in FIG. 2, the X position of an object herein mentioned is represented by a position in the world coordinate system. However, by transforming the coordinates of a display area into the screen coordinate system, such an X position can be transformed into, for example, the X position with the origin (0, 0) at an upper left corner of the screen. It is possible to express the center of the screen as 0, the right side thereof as +xn, and the left side. Thereof as −xn. The coordinates of an object as expressed in the screen coordinate system correspond to the horizontal position of the object on the monitor screen. Accordingly, it is possible to use the X position of an object as the audio image position parameter. Conversion from the X position value to the audio image position parameter is performed by using a conversion table or a conversion function f2(x, y). It is possible to obtain the sense of image position (audio image position parameter) with the Y position (vertical position) added thereto by performing processing by means of the DSP.

The Z axis direction in the world coordinate system represents the depth (or the perspective). A difference between the z value at a visual point position and the z position value of an object generally corresponds to a distance between the visual point and the object. This can be used as a depth parameter. The sense of depth can be expressed by changing the ringing (reverb) of sounds according to the distance. This can be done by the DSP. The z position value is converted into the depth parameter by using a conversion table or a conversion function f3(z).

When the coordinate transformation (such as perspective transformation and projection transformation) of object data is conducted in order to obtain a picture as seen from the visual point located in the three-dimensional virtual space, the object seems to be large when it is at a position close to the visual point position, and the object seems to be small when it is at a position far from the visual point position. In general, sounds are quiet when the sound source is located far away, and sounds are loud when the sound source is located close. Accordingly, the size L of an objects is used as a volume parameter for setting the volume. The object size L in the world coordinate system is converted into the screen coordinate system by using a conversion table or a conversion function f4' (L) and is then used as the volume parameter. The z position also represents a distance. Therefore, it is possible to determine the volume parameter by using both the size and the z position by means of a conversion table or a conversion function f4(z, L). When the object size is smaller than a threshold value, the production of sounds is suspended, thereby it is possible to avoid offensive sounds due to too many sound sources.

Of the color designation code of an object, the color bank designation is capable of adding appropriate color changes to a standard color tone by designating a color bank which conforms with an atmosphere of, for example, a morning, a daytime or an evening so that such an atmosphere can be expressed. By utilizing this method, the tone color and the musical interval of pieces of music or sounds are set. For this purpose, a table or a conversion function f5(c) is used for converting data c of the color bank into the tone color and musical interval parameter. Examples of objects in this case are environmental elements such as the sun, streetlights, indoor lighting, snow, rain, fog, the outer space, the undersea atmosphere, and caves.

Moreover, if an object is glass, clouds or the like which intercept the sound source, it is possible to decrease the volume by using a reflectance ratio, transparency and the like which are other display parameters of the object. When sound source objects overlap one over another or when a sound source object is intercepted by another object, it is possible by means of priority to make the production of sounds from one sound source object prevail over the other or to decrease the volume of the sound source object.

The above-described function to set sound production conditions of a sound source as the audio parameter by converting the display parameter of object data or by making no changes to the display parameter (when a conversion coefficient is 1) as described later corresponds to the audio parameter generating means.

Figure 4:
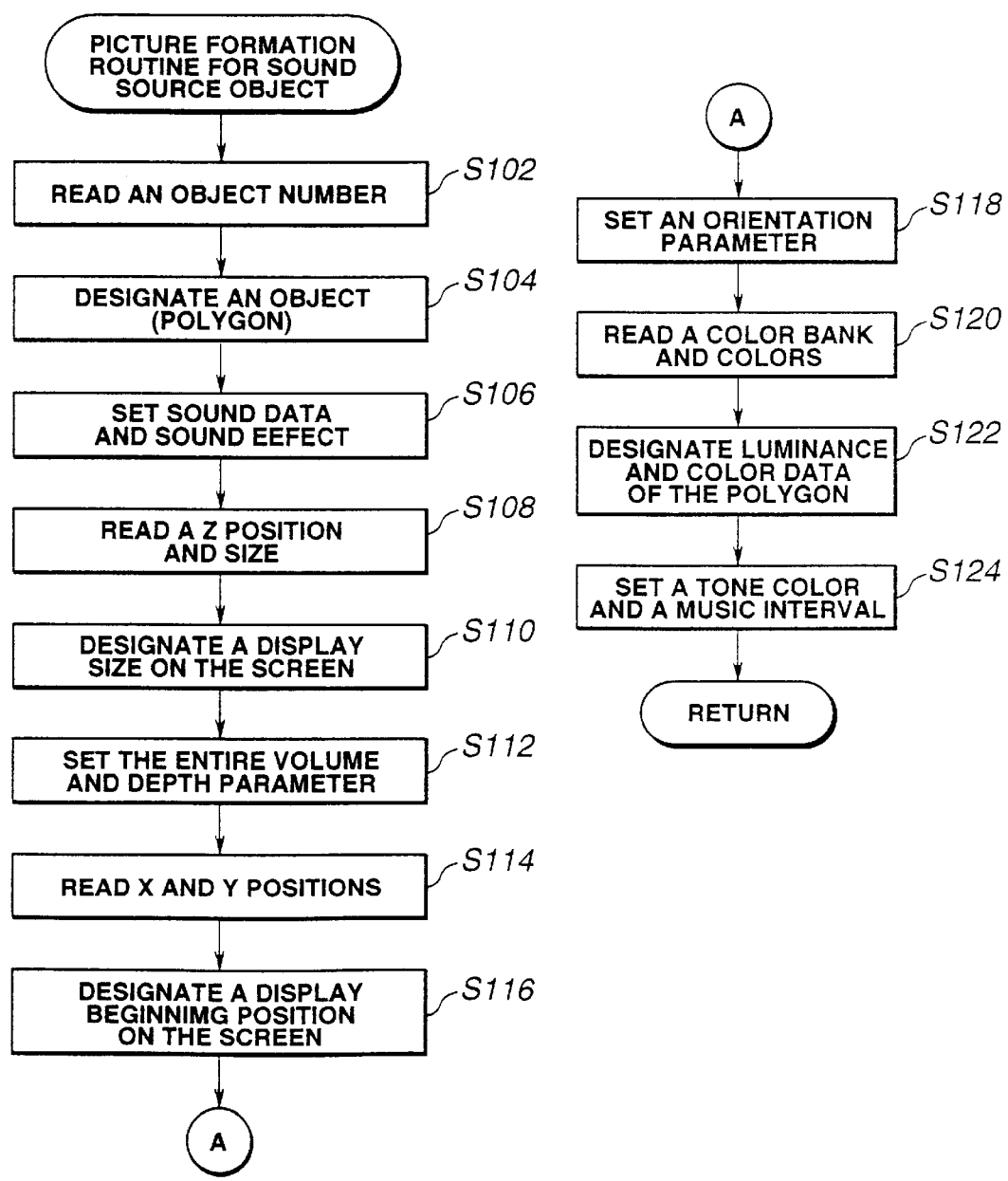
FIG. 4 is a flowchart which explains the formation of pictures and the setting of the audio parameter at a sound source when the first object data is used.

An explanation is hereinafter given about the control operation of the CPU, which performs the formation of pictures and the control of sound production by using the above-described object data, by referring to FIG. 4. In order to form a picture as seen from a certain visual point position, the CPU 101 performs, during a picture formation program (not shown), the process to locate objects in the three-dimensional virtual space by referring to an object table at such a visual point position. This process includes the following procedure to locate a sound source object, which is the object to serve as a sound producing source:

An object number of the sound source object is read from an object table formed in the RAM 102 (S102). Polygon data corresponding to this object number is read from the database and such polygon data is given to the VRAM 121 of the video block 11 (S104). An audio data number corresponding to the object number is set at the RAM 142 (S106). This makes it possible to supply sound data and gave sounds to the sound source.

The Z position and the object size are read from the object data (S108). On the basis of this data, the display size of a polygon on the screen is written into the VRAM 122 (S110). The entire volume and depth parameter is obtained by a conversion table or a conversion function f4(z, L) according to the Z position and the object size data and is then written into the RAM 142 (S112). The X and Y positions of the object are read from the object data (S114). A screen display position of the polygon is written into the VRAM 121 (S116). An audio image position parameter is obtained by means of a conversion table or a conversion function f2(x, y) and is then written into the RAM 142 (S118). Color information such as luminance, colors and a color bank is read from the object data (S120). This color information is written into the VRAM 121 (S122). A tone color and musical interval parameter is obtained by means of a conversion table or a conversion function f5(c) on the basis of the color bank and is then written into the RAM 142 (S124).

When the object data includes the direction of a normal, it is possible to perform the processing to form a reflection, shade or the like in accordance with a position relationship between a polygon face and a light source. In this case, it is possible to change the audio parameter according to the state of reflections and shades of the object by utilizing the normal direction data, thereby producing a sound effect for expressing a reflecting light and a sound effect for expressing the state of darkening.

The CPU repeats reading all the object data of the object table and, when it reads in the sound source object, the CPU writes both picture data and audio data. Of the audio data, only the data such as the sound image position that is necessary for the proceeding of a game can be optionally utilized.

The VDP of the video block 11 performs picture formation in accordance with the parameters written in the VRAM 121. The CPU of the sound block 12 controls the SP 140 in accordance with the audio parameter and the sound production command written in the RAM 142. The video block 11 and the sound block 12 are capable of operating independently of each other. As a result, the formation of pictures can be synchronized with the production of sounds.

Figure 5:
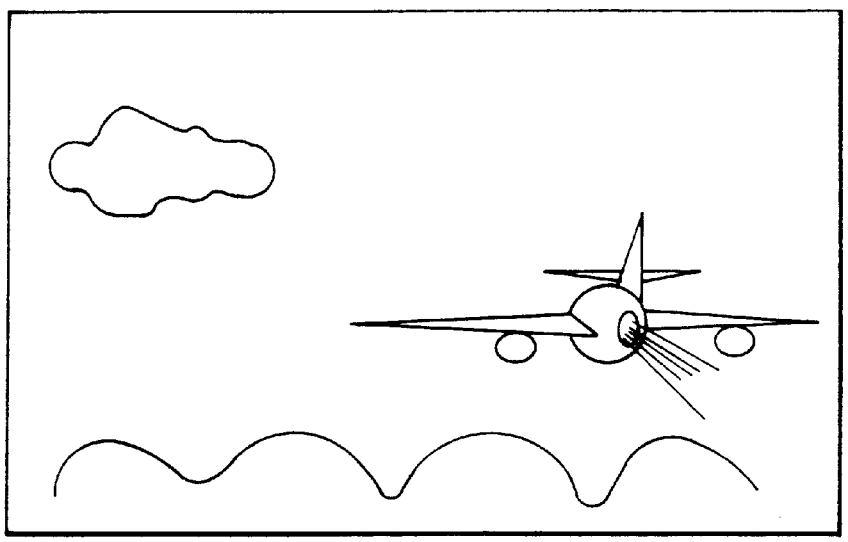
FIG. 5 shows a relationship between an object position before movement and an audio parameter (audio image position parameter).
Figure 6:
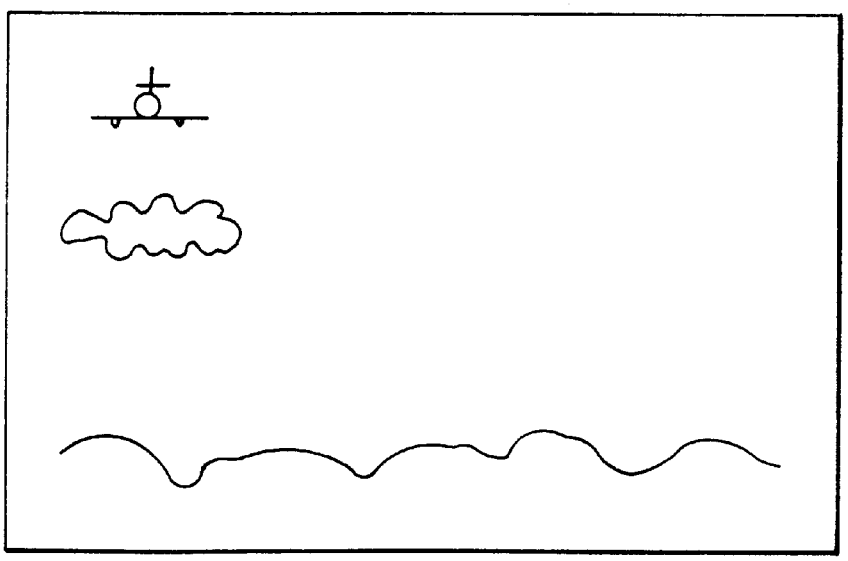
FIG. 6 shows a relationship between the object position after movement and the audio parameter (audio image position parameter).

When such processing is performed for each visual point position in a frame cycle of a video signal, for example, as shown in FIGS. 5 and 6, the audio image position, the sense of distance, the volume and the like of the sound source are set in accordance with movements of a space position of the sound source object (airplane). As a result, the sound effect is obtained, which expresses as if the object (airplane) moving on the screen moves as the sound source.

Replacement of the audio parameter is not always necessary each time the sound source object moves. It is possible to reduce the amount of arithmetic processing by determining that the audio parameter be updated when the sound source object has moved for a certain distance or for each certain number of frames of a predetermined picture signal.

Figure 7:
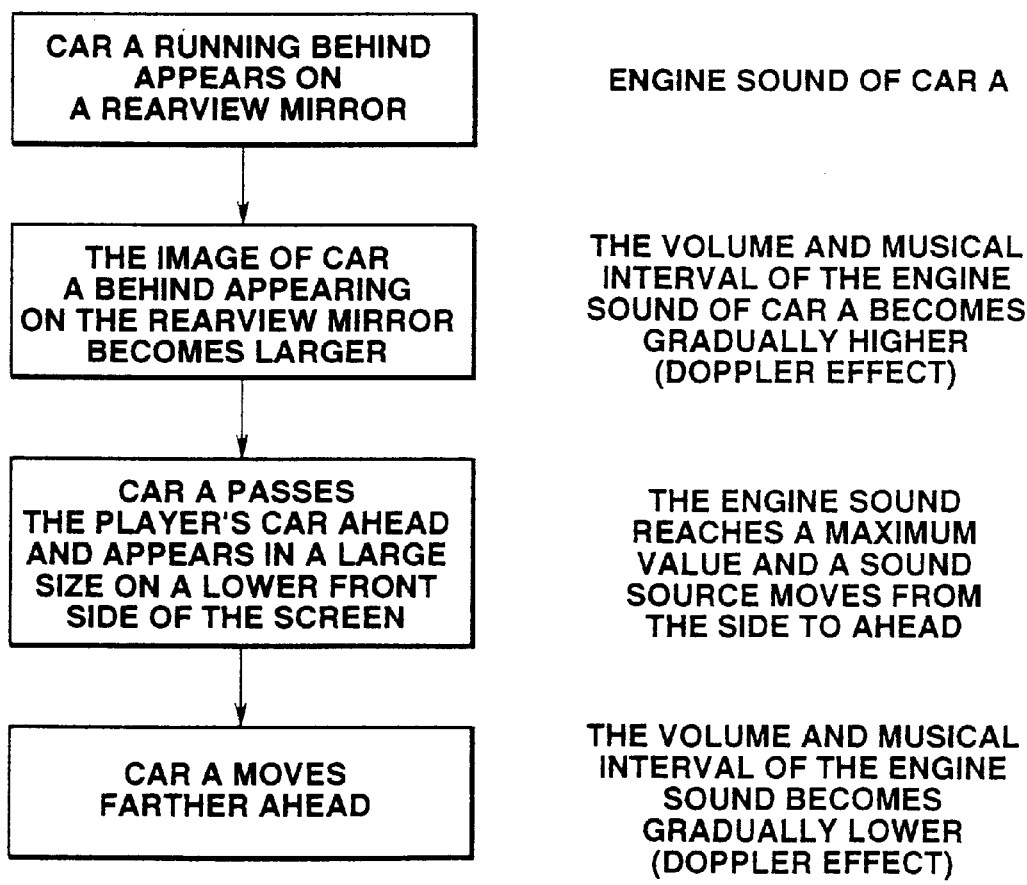
FIG. 7 explains in chronological order an example of the display parameter and the audio parameter of an object by taking an example of a car passing another car ahead.
Figure 8:
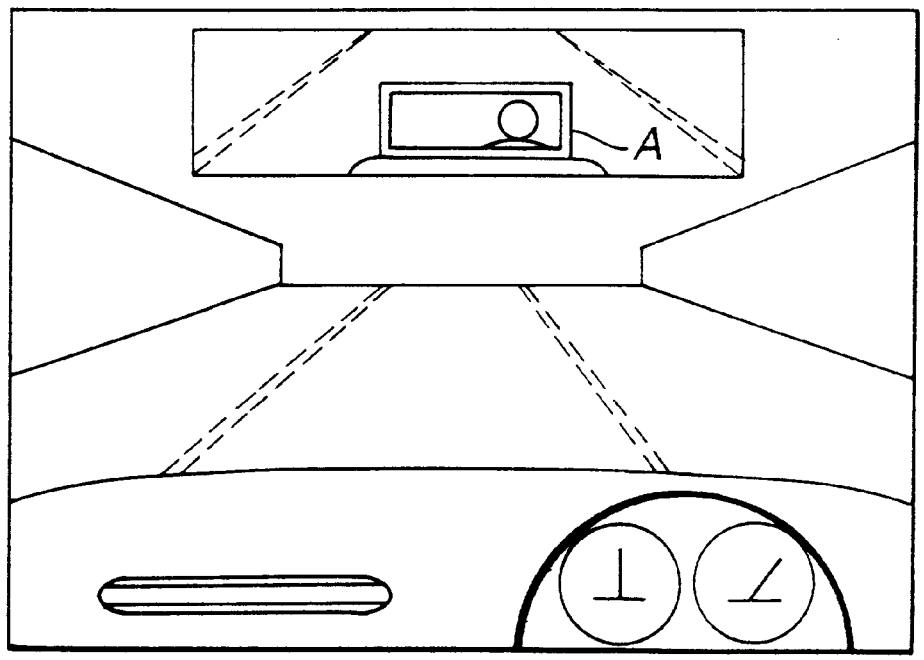
FIG. 8 shows a screen display when a car passes another car ahead.

Another example of the picture display mode according to the above-described routine is hereinafter described with reference to FIGS. 7 and 8.

This is an example of a car game. FIG. 8 is a game screen and there is a rear view mirror above the view from a driver's seat of a game player's car. Car A, the sound source object, approaches from behind and appears in the rear view mirror. The game player can then hear an engine sound of car A. Car A comes closer and the engine sound becomes louder, and the musical interval rises due to the Doppler effect. Car A catches up with and passes the player's car ahead. The image of car A appears in a large size in the forward direction on the screen. At this time, the engine sound of car A becomes a maximum value. Then, car A moves farther ahead and the engine sound gradually lowers. The musical interval of the engine sound lowers because of the Doppler effect. Moreover, the sound image orientation is set so that the sound source exists at the X position in accordance with the X position of car A on the screen.

FIG. 9 shows an example of a second object data structure. In this example, the object data structure of a sound source object to serve as a sound producing source in the virtual space includes the audio parameter. For example, if the sound source object is to move along a previously determined course within the virtual space, it is possible to previously find the audio parameter. It is possible to form object data in a format including the display parameter and the audio parameter, to store such object data as game data on a CD-ROM, and to load the object data from the CD-ROM onto the RAM 103 prior to the start of a game. This makes it possible to mitigate the reference to the aforementioned conversion table or the arithmetic is processing by means of the conversion functions.

When the sound source object is capable of freely moving within the virtual space, the audio parameter may be found from the object data structure (1) as shown in FIG. 3 and be reformed into the object data structure (2) as shown in FIG. 9, and setting of the display parameter and the audio parameter may be performed by using the object data structure (2) to perform the formation of pictures and the production of sounds in parallel.

Figure 10:
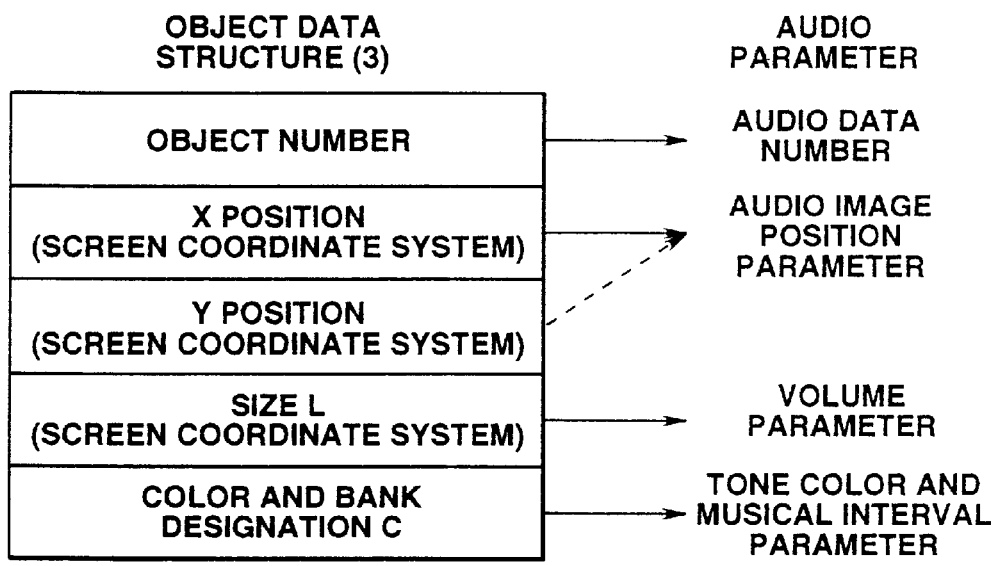
FIG. 10 shows an example of a third object data structure.

FIG. 10 shows an example of a third object data structure which retains the object data as values in the two-dimensional virtual space or values of the screen coordinate system (in two dimensions).

As described before, taking into consideration the corresponding relationship with a display position of an object on the monitor, it is desirable (without limitation) that position information about the object in the world coordinate system be used as the audio parameter after conversion into the screen coordinate system. On this point, in the two-dimensional game space, a position of an object can be made to correspond to a position on the monitor screen. Accordingly, it is possible to use the display parameter of object data more easily.

With a game in the three-dimensional virtual space as well, it is possible to transform object data of the world coordinate system into the screen coordinate system so as to obtain object data of the screen coordinate system, and to construct a polygon picture by using such object data. In this case, the display parameter of the object data (polygon) of the screen coordinate system can be used as the audio parameter.

Figure 11:
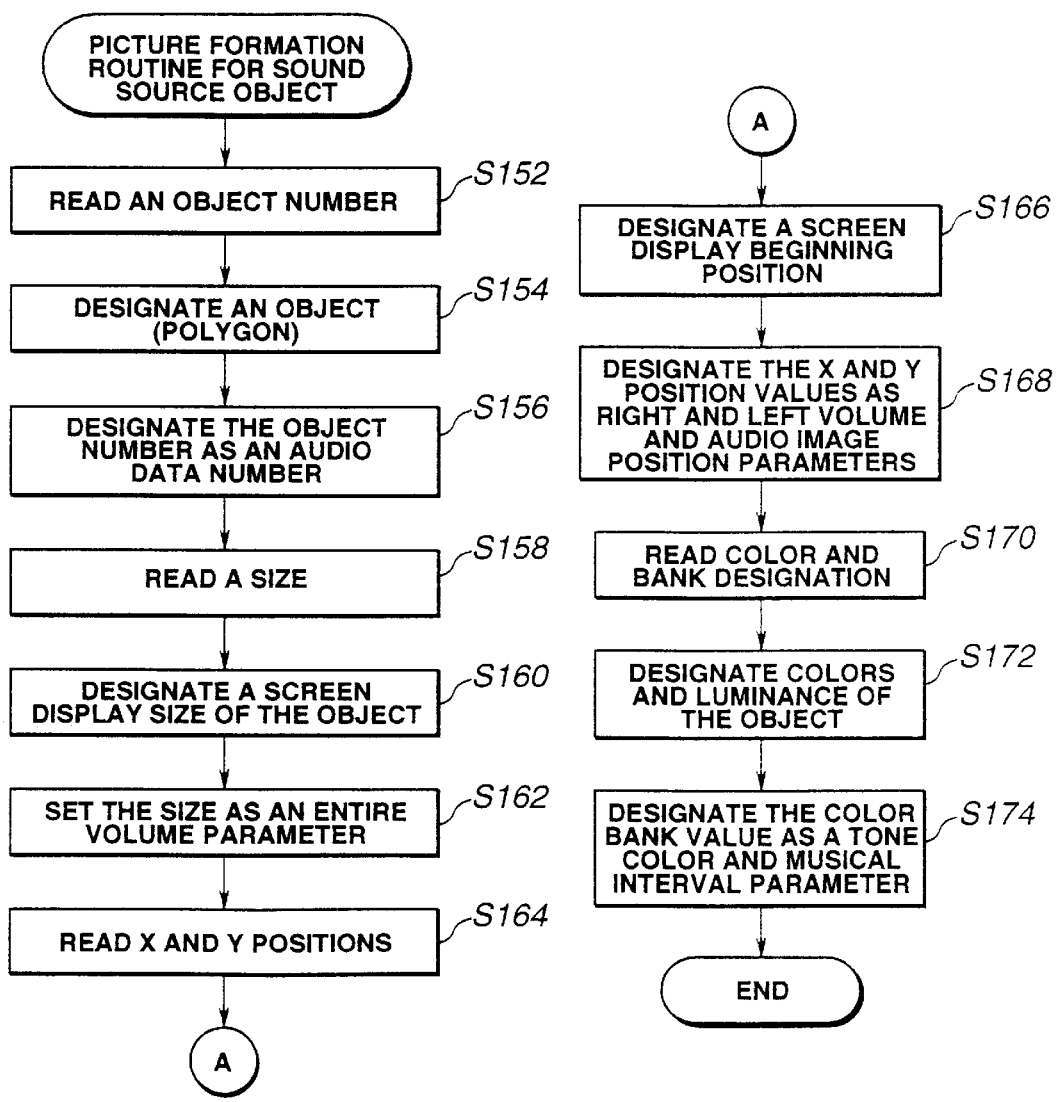
FIG. 11 is a flowchart that describes the formation of pictures and the setting of the audio parameter at a sound source when the third object data is used.

FIG. 11 is a flowchart that describes an example where the display parameter and the audio parameter are set by using the third object data structure.

In FIG. 11, the main CPU refers to an object table for picture formation processing and locates objects in the game space by referring to object data in the table. If a sound source object then exists in the object table, the following processing is performed:

A data number of the sound source object is first read from the object table formed in the RAM 102 (S152). Polygon data corresponding to this object number is read from the database and is given to the VRAM 121 of the video block 11 (S154). The object number is written into the RAM 142 as an audio data number (S156). The size of the object is read from the object data (S158). The display size of a polygon of this data on the screen is written into the VRAM 121 (S160). Data of the object size is written into the RAM 142 as an entire volume parameter (S162). X and Y positions of the object are read from the object data (S164). The screen display position of the polygon is written into the VRAM 121 (S166). The X position of the object is written into the RAM 142 as an audio image position parameter. If necessary, it is possible to use also the Y position value as the audio image position parameter (S168). Color information such as luminance, colors and a color bank is read from the object data (S170). This color information is written into the VRAM 121 (S172). The color bank value is written into the RAM 142 as a tone color and musical interval parameter (S174).

The VDP of the video block 11 performs picture formation in accordance with the parameters written into the VRAM 121. The CPU of the sound block 12 controls the SP 140 in accordance with the audio parameter (sound production conditions) and the sound production command written on the RAM 142. The video block 11 and the sound block 12 are capable of operating independently of each other. As a result, the formation of pictures can be synchronized with the production of sounds.

FIGS. 12 and 13 describe structure examples when the musical interval is to be changed.

In FIG. 12, reference numeral 210 indicates a memory for retaining sound data outputs within the sound processor 140, reference numeral 212 indicates a D/A converter for converting sound data into a sound signal, reference numeral 214 indicates an amplifier for amplifying the level of the sound signal, reference numeral 216 indicates a speaker for converting the sound signal into sounds, and reference numeral 218 indicates a selector for selecting clock signals of different frequencies in accordance with the content of a color bank signal. For example, if a color bank signal for setting the color in a dark tone is given to the selector, a clock signal of the frequency lower than a normal value is selected. If a color bank signal for setting the color in a light tone is given to the selector, a clock signal of the frequency higher than a normal value is selected. The selected clock signal is given to the memory 210 and the D/A converter 212. As a result, the musical interval of sounds is controlled according to the color bank signal.

FIG. 13 shows another example which functions in a similar manner, and in which the voltage at a level corresponding to the content of the color bank signal is outputted by a decoder 222. This output voltage controls an oscillation frequency of a VCO 220. An output signal of the VCO 220 is given as a clocksignal to the sound data memory 210 and the D/A converter 212. As a result, it is possible to control the musical interval of sounds according to the various content of the color bank signal.

According to the embodiment of this invention, the audio parameter can be set quickly in accordance with movements of an object such as a car or airplane that is a sound source. Since a picture to be displayed on a television is updated in every frame cycle of, for example, one-sixtieth of a second or one-thirtieth of a second, the audio parameter is updated in the frame cycle, thereby it is possible to cause the sound production operation of the sound source to quickly correspond to the movements of the object, scene setting or environmental setting. When coordinates of an object image in the three-dimensional virtual space are transformed to the screen display coordinate system, so-called clipping processing to treat objects outside view as being not subject to processing. Even if objects are the sound source objects, this clipping processing excludes and organizes the objects outside view, which is favorable.

Also when the sound source is controlled according to the previously programmed content in accordance with a game story as in a conventional case, it is possible to control the sound source from time to time in accordance with various individual information, such as the object position, semi-transparency and display priority, which is held by the display parameter, thereby reducing a burden of preparing a program in conformity with the game story.

Upon the formation of pictures by reading the display parameter of an object, the audio parameter of the sound source is formed by using the read display parameter and is then set at the sound source. Accordingly, it is possible to set the sound production conditions by using display information of the object and to link sounds to picture information of the object.

An information storage medium for storing application software such as a game program or object data is not limited to a ROM cassette or a CD-ROM as described above. For example, the information storage medium includes the medium capable of storing information in the same manner such as a magnetic card, a DVD, a cassette tape, a RAM with a battery back-up, a ROM/RAM card (memory card), a floppy disk, a magnetic disk, a photo-magnetic disk, and a communication network such as Internet.

As described above, with the game device of this invention, the audio parameter of the sound source is set by using the display parameter of an object and, therefore, it is possible to perform the formation of pictures together with the production of sounds and it is easy to synchronize the movements of pictures with sounds.

What is claimed is:

1. A game device comprising:
   storage means for storing a plurality of object data including a display parameter for representing a display condition of an object to be located in a virtual space;
   game proceeding means for proceeding a game by locating the object in the virtual space in accordance with a game program and by controlling movements of the object;
   picture processing means for transforming the object, which has come into view as seen from a visual point located in the virtual space, into an image of a screen coordinate system and for displaying the image on a picture display unit;
   a game sound source for producing music intervals of pieces of music or sounds which accompany the game; and
   sound source controlling means for controlling the game sound source based on the display parameter of a sound source object for at least the object which has come into view; wherein
   said display parameter includes for an object position in said virtual space, priority information for determining the priority of displaying two or more of the objects that appear to occupy the same position coordinates on the picture display unit; and
   said display parameter includes at least any one of the following among an object position in the virtual space, an object size, object color information, object transparency, and reflectance ratio;
   said picture processing means and said sound source controlling means change a tone color of the object and the musical interval of pieces of music or sounds according to the object color information;
   said sound source controlling means controls the volume of the music intervals of pieces of music or the sounds based upon at least one of the reflectance ratio, and the object transparency;
   said sound source controlling means determines the volume parameters based upon the object size and a z-coordinate of the object position; and
   said sound source controlling means modifies said audio parameter by means of a conversion function or a conversion table and uses the modified audio parameter.

2. The game device according to claim 1, wherein said audio parameter is updated in a frame update cycle of the picture display unit.

3. The game device according to claim 1, wherein said audio parameter includes at least any one of the following among an audio image position parameter, a depth parameter, a volume parameter, and a reverb parameter.

4. A game device comprising:
  storage means for storing object data of an object group including a sound source object, the sound source object having a display parameter for representing a display condition of the object to be located in a virtual space and an audio parameter for representing a sound production condition when said object is an object to serve as a sound producing source;
  game proceeding means for proceeding a game by locating the object in said virtual space in accordance with a game program and by controlling movements of the object;
  picture processing means for transforming the object, which has come into view as seen from a visual point located in said virtual space, into an image of a screen coordinate system and for displaying the image on a picture display unit;
  a game sound source for producing music intervals of pieces of music or sounds which accompany the game; and
  sound source controlling means for controlling the game sound source based on the display parameter of said sound source object for at least the object which has come into view, wherein
    said display parameter includes for an object position in said virtual space, priority information for determining the priority of displaying two or more of the objects that appear to occupy the same position coordinates on the picture display unit; and
    said display parameter includes for an object position in said virtual space at least any one of the following for an object position in said virtual space including an object size, object color information, object transparency, and reflectance ratio;
    said picture processing means and said sound source controlling means change a tone color of the object and the musical interval of pieces of music or sounds according to the object color information;
    said sound source controlling means controls the volume of the music intervals of pieces of music or the sounds based upon at least one of the reflectance ratio, and the object transparency;
    said sound source controlling means determines the volume parameters based upon the object size and a z-coordinate of the object position; and
    said sound source controlling means modifies said audio parameter by means of a conversion function or a conversion table and uses the modified audio parameter.

5. The game device according to claim 4, wherein said audio parameter is updated in a frame update cycle of said picture display unit.

6. The game device according to claim 4, wherein said audio parameter includes at least any one of the following among an audio image position parameter, a depth parameter, the volume parameter, and a reverb parameter.

7. A game device for displaying on a picture display unit an object related to a game in accordance with a game program and for producing, from a sound source, game sounds corresponding to the displayed object, wherein an audio parameter for determining a sound production condition of said sound source is updated by an object display parameter for representing a display mode of said object on a screen; wherein said object display parameter includes for an object position in virtual space, priority information for determining the priority of displaying two or more of the objects that appear to occupy the same position coordinates on the picture display unit; and
  said object display parameter includes for an object position in said virtual space at least any one of the following for an object position in said virtual space including an object size, object color information, object transparency, and reflectance ratio;
  a tone color of the object and the sound is changed according to the object color information;
  the volume of sound is controlled based upon at least one of the reflectance ratio, and the object transparency;
  the volume parameters are determined based upon the object size and a z-coordinate of the object position; and
  said audio parameter are modified by means of a conversion function or a conversion table and uses the modified audio parameter.

8. The game device according to claim 7, wherein the display parameter of said object is represented in a screen coordinate system.

9. The game device according to claim 7, wherein the update of said audio parameter is performed in a frame update cycle of said picture display unit.

10. The game device according to claim 7, wherein said audio parameter includes at least any one of the following among an audio image position parameter, a depth parameter, a volume parameter, and a reverb parameter.

11. A computer-readable information storage medium encoded with instructions for directing a processor to:
  store object data including a display parameter for representing a display condition of an object to be located in a virtual space;
  locate the object in a virtual space;
  process the object data and display the object in accordance with the processed data;
  produce music intervals of pieces of music or sounds from waveform data obtained from the object data; and
  control the sound source for the object using the object data; wherein
    said display parameter includes for an object position in said virtual space, priority information for determining the priority of displaying two or more of the objects that appear to occupy the same position coordinates on the picture display unit; and
    said display parameter includes for an object position in said virtual space at least any one of the following for an object position in said virtual space including an object size, object color information, object transparency, and reflectance ratio; the processor being further directed to:
      change a tone color of the object and the musical interval of pieces of music or sounds according to the object color information;
      control the volume of the music intervals of pieces of music or the sounds based upon at least one of the reflectance ratio, and the object transparency;
      determine the volume parameters based upon the object size and a z-coordinate of the object position; and
      modify said audio parameter by means of a conversion function or a conversion table and uses the modified audio parameter.

12. The computer-readable information storage medium according to claim 11 further comprising instructions for directing the processor to:
 determine the sound output wherein the object data prescribes the volume, direction and orientation of the sound.

13. A computer-readable information storage medium encoded with instructions for directing a processor to:
 store object data including a display parameter for representing a display condition of an object to be located in a virtual space and an audio parameter for representing a sound production condition for said object;
 process the object data and display the object in accordance with the processed data;
 produce music intervals of pieces of music or sounds from waveform data obtained from the object data;
 control the sound source for the object using the object data; and
 determine the game sound output wherein the object data prescribes the volume, direction and orientation of the sound; wherein
  said display parameter includes for an object position in said virtual space, priority information for determining the priority of displaying two or more of the objects that appear to occupy the same position coordinates on the picture display unit; and
  said display parameter includes for an object position in said virtual space at least any one of the following for an object position in said virtual space including an object size, object color information, object transparency, and reflectance ratio;
  change a tone color of the object and the musical interval of pieces of music or sounds according to the object color information;
  control the volume of the music intervals of pieces of music or the sounds based upon at least one of the reflectance ratio, and the object transparency;
  determine the volume parameters based upon the object size and a z-coordinate of the object position; and
  modify said audio parameter by means of a conversion function or a conversion table and uses the modified audio parameter.

14. A computer-readable information storage medium encoded with instructions for a game program for directing a processor to:
 display an object related to the game program based on object data including a display parameter for representing a display condition of an object to be located in a virtual space;
 produce music intervals of pieces of music or game sounds corresponding to the displayed object; and
 determine the game sounds output wherein the object data prescribes the volumes direction and orientation of the sound; wherein
  said display parameter includes for an object position in said virtual space, priority information for determining the priority of displaying two or more of the objects that appear to occupy the same position coordinates on the picture display unit; and
  said display parameter includes for an object position in said virtual space at least any one of the following for an object position in said virtual space including an object size, object color information, object transparency, and reflectance ratio; the processor being further directed to:
   change a tone color of the object and the musical interval of pieces of music or sounds according to the object color information;
   control the volume of the music intervals of pieces of music or the sounds based upon at least one of the reflectance ratio, and the object transparency;
   determine the volume parameters based upon the object size and a z-coordinate of the object position; and
   modify said audio parameter by means of a conversion function or a conversion table and uses the modified audio parameter.

15. A method for producing sounds using a display parameter comprising:
 storing object data including a display parameter for representing a display condition of an object to be located in a virtual space;
 locating the object in a virtual space;
 processing the object data and display the object in accordance with the processed data;
 producing music intervals of pieces of music or sounds from waveform data obtained from the object data; and
 controlling the sound source for the object using the object data; wherein
  said display parameter includes for an object position in said virtual space, priority information for determining the priority of displaying two or more of the objects that appear to occupy the same position coordinates on the picture display unit; and
  said display parameter includes for an object position in said virtual space at least any one of the following for an object position in said virtual space including an object size, object color information, object transparency, and reflectance ratio;
  changing a tone color of the object and the musical interval of pieces of music or sounds according to the object color information;
  controlling the volume of the music intervals of pieces of music or the sounds based upon at least one of the reflectance ratio, and the object transparency;
  determining the volume parameters based upon the object size and a z-coordinate of the object position; and
  modifying said audio parameter by means of a conversion function or a conversion table and uses the modified audio parameter.

16. The method of claim 15 wherein the sound processing includes:
 reading the display parameter from the object data of the sound source object; and
 converting the read display parameter into an audio parameter for representing a sound production of said game sound source.

17. The method of claim 16 further comprising:
 updating the audio parameter in a frame update cycle of a picture display unit.

18. The method of claim 16 wherein the audio parameter includes at least any one of the following among an audio image position parameter, a depth parameter, a volume parameter, and a reverb parameter.

19. A sound processing device comprising:
 a sound processor for producing sounds by converting display parameters related to an object to be located in virtual space into audio parameters;
 a display for displaying an Image based on the display parameters;
 a game sound source for producing music intervals of pieces of music or sounds which accompany the game; and an input module for generating the display parameters of the object; wherein said display parameter Includes for an object position in said virtual space, priority information for determining the priority of displaying two or more of the objects that appear to occupy the same position coordinates on the picture display unit; and said display parameter includes for an object position in said virtual space at least any one of the following for an object position in said virtual space including an object size, object color information, object transparency, and reflectance ratio;

said sound processor and said input module change a tone color of the object and the musical interval of pieces of music or sounds according to the object color information;

said sound processor controls the volume of the music intervals of pieces of music or the sounds based upon at least one of the reflectance ratio, and the object transparency;

said sound processor determines the volume parameters based upon the object size and a z-coordinate of the object position; and said sound processor modifies said audio parameter by means of a conversion function or a conversion table and uses the modified audio parameter.

* * * * *